United States Patent [19]

Tsai

[11] Patent Number: 4,496,316

[45] Date of Patent: Jan. 29, 1985

[54] TARGET WALL AIR JET FOR CONTROLLING COMBUSTION AIR

[75] Inventor: Yih-Wan Tsai, Pittsburgh, Pa.

[73] Assignee: PPG Industries, Inc., Pittsburgh, Pa.

[21] Appl. No.: 510,808

[22] Filed: Jul. 5, 1983

[51] Int. Cl.³ .......................... F24H 7/00; F27D 17/00
[52] U.S. Cl. ...................................... 432/30; 432/180; 432/181
[58] Field of Search ............... 432/149, 150, 179, 180, 432/181, 182, 189, 191, 196, 29, 30; 137/803, 888, 892; 65/336

[56] References Cited

U.S. PATENT DOCUMENTS

| | | | |
|---|---|---|---|
| 1,422,858 | 7/1922 | Heilman | 432/189 |
| 1,446,666 | 2/1923 | Schulmeyer et al. | 137/888 |
| 1,798,611 | 3/1931 | Leventry | 432/182 |
| 4,375,235 | 3/1983 | Tsai | 165/1 |
| 4,375,236 | 3/1983 | Tsai | 165/1 |

FOREIGN PATENT DOCUMENTS

| | | | |
|---|---|---|---|
| 1094396 | 12/1960 | Fed. Rep. of Germany | 432/180 |
| 190165 | 2/1924 | United Kingdom | 432/180 |
| 215994 | 5/1924 | United Kingdom | 432/180 |

OTHER PUBLICATIONS

Pincus, Alexis G., "Combustion Melting in the Glass Industry", The Glass Industry, 1980, pp. 180-184.

*Primary Examiner*—John J. Camby
*Attorney, Agent, or Firm*—Dennis G. Millman; Rita M. Irani

[57] ABSTRACT

A method of and apparatus for selective control of combustion gas flow in a furnace firing port in a furnace of the type having a plurality of firing ports, each port having a passageway for receiving combustion gas, e.g. preheated air, from a common plenum chamber, wherein the chamber includes a back or target wall in opposed spaced relationship to each of the passageways. A flow control pipe is inserted through a plenum wall directed toward the passageway between the plenum and port. A small quantity of pressurized gas, e.g. air, is injected generally along the flow path of combustion air in the plenum toward passageway to alter the amount of combustion air flowing into the port. In a preferred embodiment, combustion air is increased by injecting air through a target wall flow control pipe cocurrent with the flow to induce additional flow into the port and combustion air is decreased by injecting air countercurrent to the flow adjacent to the passageway to impede flow into the port.

12 Claims, 3 Drawing Figures

TARGET WALL AIR JET FOR CONTROLLING COMBUSTION AIR

BACKGROUND OF THE INVENTION

This invention relates to furnaces and their operation, and in particular, to furnaces including a plurality of combustion chambers or firing ports which receive heated combustion air from a common distributing chamber or plenum, for combining with fuel to produce a combustion flame. More particularly, the invention relates to controlling the apportionment of combustion air among such chambers or ports in, e.g. a multiport regenerative furnace.

More particularly, the invention relates to controlling the amount of combustion air delivered to any individual firing port from a common combustion air distribution chamber or plenum, e.g. in a multiport regenerative furnace having a nonpartitioned plenum. Such furnaces generally include a plurality of firing ports on each side of the furnace chamber, with ports on one side aligned with, in opposing relation to, ports on the other side. During the firing phase, combustion air passes through the regenerator, where it is heated, through the plenum and to the firing ports where it is combined with fuel for producing a combustion flame for heating material in the furnace chamber. Exhaust gases from each port pass through its opposing port and down through the opposite regenerator for heating the regenerator packing. In other words, while the exhaust phase firing port is receiving exhaust gases, its regenerator is absorbing heat from the exhaust gases and the other firing phase firing port is receiving heated combustion air through its regenerator. The side of the furnace receiving fuel and heated combustion air is periodically reversed so that each side alternately participates in an exhaust phase and a firing phase.

As used herein, combustion air is not limited to any particular combination of gases or proportions thereof, but is used for simplicity to refer to any gas which, when combined with fuel, produces a combustible mixture.

The problem of uneven combustion air distribution within the regenerator of a furnace having a gas distributing chamber atop a regenerator bed is discussed in U.S. Pat. No. 4,375,236 to Tsai, the teachings of which are hereby incorporated by reference. As taught therein, air jets can be utilized to affect a more uniform distribution of gas within a regenerator bed by influencing gas distribution in the plenum. However, in a multiport furnace, e.g. a glass melting furnace, it is common to have individual ports operating at different firing rates which requires a nonuniform combustion air distribution among the ports for optimal furnace efficiency. More particularly, furnace efficiency depends upon proper distribution of energy input among the firing ports in order to provide an appropriate amount of energy for the portion of the furnace underlying the port. In general, a change in furanace operating conditions such as throughput, melt composition or furnace upset requires a redistribution of energy inputs among the ports to minimum furnace efficiency within an acceptable range. This redistribution is generally accomplished for a given total fuel input by apportioning the fuel among the ports in a nonuniform manner.

The nonuniform fuel distribution requires a correspondingly nonuniform distribution of combustion air among the ports. Too much combustion air relative to the amount of fuel in a particular firing port may be undesirable because the excess heated air is not utilized for combustion. Too little combustion air results in wasted, non-combusted fuel. Although it is possible to increase total combustion air input, e.g. by adjustment of the blower, and thus effect an increase in air to ports where needed, this also increases air to ports which may already have the desirable amount of air resulting in less than desired overall efficiency. In other words, for any given total fuel input, there is an optimal amount of total combustion air needed for overall furnace efficiency. At the same time, for any individual port, there is also an optimum amount of combustion air for its fuel input. Consequently, disproportionate fuel input among the ports requires a correspondingly disproportionate combustion air input to affect the desired fuel-air mixture and hence optimize efficiency. It would therefore be desirable to selectively increase air in only these ports where it is needed while maintaining the proper amount of total combustion air input to the furnace relative to the total fuel input.

In the past, control of the combustion air distribution in individual firing ports has been accomplished primarily by using barriers, e.g. damper tiles made of refractory material, inserted in various locations within the firing port to partially obstruct the flow of combustion air through the port. With this technique, total combustion air can be increased, e.g., by increasing blower output, and then dampers are used in particular ports where no increase in combustion air is desired. The use of refractory barriers or dampers, however, has several drawbacks. The refractory dampers are expensive and begin to deteriorate fairly quickly in the harsh firing port atmosphere creating accumulating debris on the port floor. This debris further obstructs flow of combustion air in an uncontrolled manner and is difficult to remove. Attempts to rake the debris from the port can result in moving the debris into the regenerators causing clogging and a decrease in flow rate through the regenerator. Furthermore, although dampers can be useful to decrease combustion air flow through a port, they are not suitable for increasing combustion air. In addition, dampers have the substantial drawback of providing only imprecise control limited by the size and shape of refractory blocks or tiles which can be conveniently inserted into the firing port at fixed locations to obstruct flow.

It would therefore be advantageous to have a method of selectively controlling combustion air in a firing port which does not have the limitations of presently available techniques.

SUMMARY OF THE INVENTION

The invention relates to a method of controlling combustion air flow through a combustion chamber, e.g., a furnace firing port, by employing a stream of gas to entrain or obstruct combustion air flowing through the port. For increasing combustion air flow, one or more gaseous jets are directed cocurrent with the primary flow path of combustion air from the source, e.g., a plenum chamber atop a regenerator, toward the port to increase the volume of combustion air flowing into the port. One or more flow control pipes are mounted through a wall of the upper plenum, e.g., the plenum wall opposite the port opening, hereinafter referred to as the target wall. A jet of gas, e.g., air, is direct toward, i.e., cocurrent with, the primary flow through the port during the furnace firing phase. With this arrangement, the target wall air jet functions to direct combustion air into the port, in general, by creating an area of high pressure for pushing combustion air and by entrainment of the combustion air in the injected air stream. Controlled increase of combustion air flow into the firing port and consequent control of the combustible mixture in the port may be accomplished, e.g., by altering the velocity of air injected by way of air jets. In this manner, the combustible mixture in any individual firing port or several ports can be selectively controlled to optimize furnace efficiency.

For decreasing combustion air to a particular port, one or more air jet pipes may be inserted through a plenum wall, e.g., the top wall adjacent to the port inlet, directed generally countercurrent to the primary combustion air flow. With this arrangement, a jet of air may be injected to impede the flow of combustion air into the port by creating a restricting flow adjacent to the passageway between the plenum and the firing port and thereby lessen the amount of combustion air entering the port.

The air jets of the present invention provide a relatively inexpensive method and apparatus for controlling combustion air flow into individual firing ports of, for example, a multiport combustion furnace utilizing preheated combustion air from a single source, to optimize overall furnace efficiency.

DETAILED DESCRIPTION OF THE PREFERRED EMBODIMENTS

Figure 1:
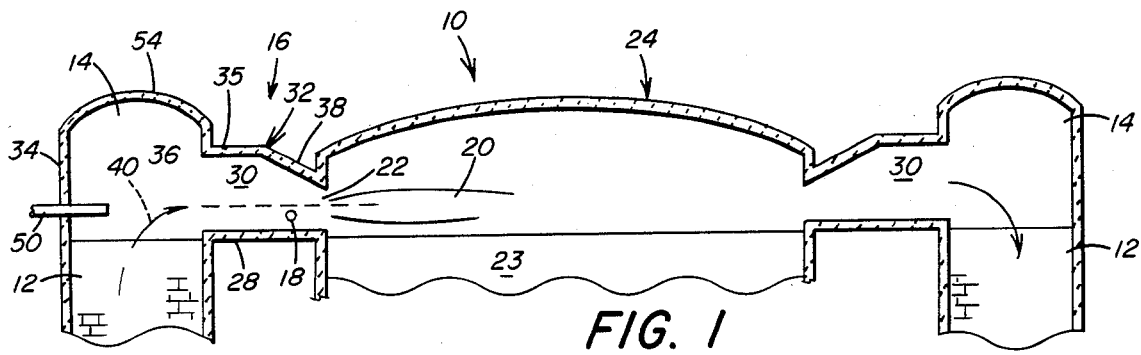
FIG. 1 is a vertical cross-sectional view of a regenerative furnace incorporating features of the invention, showing a target wall air jet for increasing combustion air flow into a firing port.

With reference to FIG. 1, there is shown a regenerative furnace 10 of the type used for melting glass. Although the invention will be described as practiced in a glass melting furnace, as will be appreciated, the invention is not limited thereto, and may be used to control combustion air flow with any combustion furnace including one or more firing ports receiving combustion air from a source of combustion air. The furnace 10 includes regenerators 12 for preheating combustion air, chamber or plenum 14 for passing the combustion air to firing port 16 for mixing with fuel, e.g., from nozzle 18, to produce flame 20 issuing from port mouth 22. The flame 20 furnishes the heat for maintaining molten body of glass and melting batch materials 23 in melting chamber 24. In the following discussion, only the port 16 is described in detail during its firing phase. In a furnace of the reverse firing type, the port 16 would alternately participate in the firing and exhaust phases of the cycle for melting the glass and batch materials.

The illustrated firing port 16 includes a floor 28, sidewalls 30, top wall or crown 32 and target wall 34. The crown 32 includes a level section 35 adjoining opening 36 for passing combustion air between the chamber 14 and the port 16 and a sloped section 38 adjoining the port mouth 22.

With continued reference to FIG. 1, there is shown a single flow control pipe 50 in the target wall 34 directed toward the flow of combustion air into and through the port 16, illustrated as broken line 40.

In general, the flow path of combustion air through a port, e.g. the port 16, is along the line connecting the centers of the opening 36 and the port mouth 22, e.g. the line 40. Although for clarity of discussion, the path is illustrated by the line 40, as can be appreciated, combustion air flows through the port in a broad stream with some turbulence. Only a small amount of flow, however, normally occurs close to the port walls. It is believed that increasing combustion gas flow close to port walls would cause accelerated deterioration of the refractory material of the walls and is therefore undesirable. In the discussion which follows, the air jets are described as directed generally along the line 40 as the preferred embodiment because, among other reasons, impingement of air from the jets on refractory walls may have deleterious side effects. For example, thermal shock could damage refractories if the air jets are at a lower temperature than the walls. In addition, even if there is no temperature difference between the walls and the jet stream, air jets impinging on walls may cause increased chemical reaction between the refractories and the port atmosphere leading to deterioration of the port walls. It is believed that the air jets will generally be more effective if they enter the combustion air stream in an area of higher stream velocity than in an area of lower stream velocity, e.g., close to the stream center. However, the described positions for air jets are not limiting to the invention. As will be appreciated, as long as the injected stream of air has a velocity component along the main combustion stream, the injected air will have a controlling effect on the combustion air stream. For example, jets may issue closer to port walls and a larger number of jets may be used to obtain the desired inducing or impeding effect, depending upon the amount of flow control desired.

In operation, a small amount of gas, e.g., air in an amount less than about 10% of total combustion air available in the plenum 14, is injected at a high velocity, e.g. 1000 ft/sec (304.8 m/s), through the pipe 50. The air jet operates to push or detect air available in the plenum 14 into the port 16 through the opening 36. Although the exact nature of the induced combustion air flow is unclear, it is believed that the target wall air jet 50 primarily pushes or redirects combustion air into the opening of the port toward which it is directed. More particularly, the target wall flow control pipe 50 is used to increase combustion air flowing through the port 16 by passing a pressurized gas, e.g., air, into the plenum 14 directed toward the opening 36. The air injected into the plenum creates a local area of high pressure relative to the surrounding pressure downstream of the nozzle which functions to push combustion air in the direction of air jet flow, i.e., toward the opening 36, thereby inducing an increase in combustion air flowing through the port 16. This may also be viewed as an entrainment effect of the air jet stream on the combustion air stream.

In a multiport furnace having a common plenum chamber such as the plenum 14, the air injected opposite one port may have some effect on adjacent ports. For example, with reference to FIG. 3, although the jet 50 primarily affects flow through the port 16, it has been found that some small but measurable increase is noticed in port 70. As can be appreciated, in some cases, ports further from the port 16 may be affected in some ways, and there may be a decrease in these ports due to the effect of redirecting combustion air into the port 16.

Figure 2:
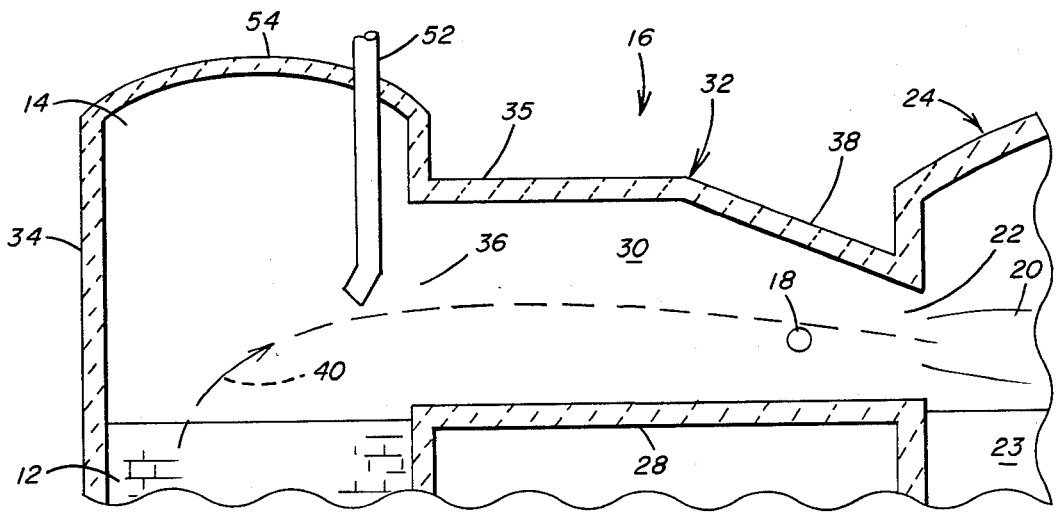
FIG. 2 is a vertical cross-sectional view of a firing port having an air jet through the plenum topwall for impeding combustion air flow into a firing port in accordance with the teachings of the invention.

With reference to FIG. 2, a flow control pipe 52 is inserted through plenum topwall 54 with its nozzle located at about the center of the opening 36 and directed away from the opening. With this arrangement, a jet of air is inserted into the primary flow path through the opening 36 to obstruct or impede combustion air flow and thereby affect a decrease in the amount of combustion air within the port 16.

Figure 3:
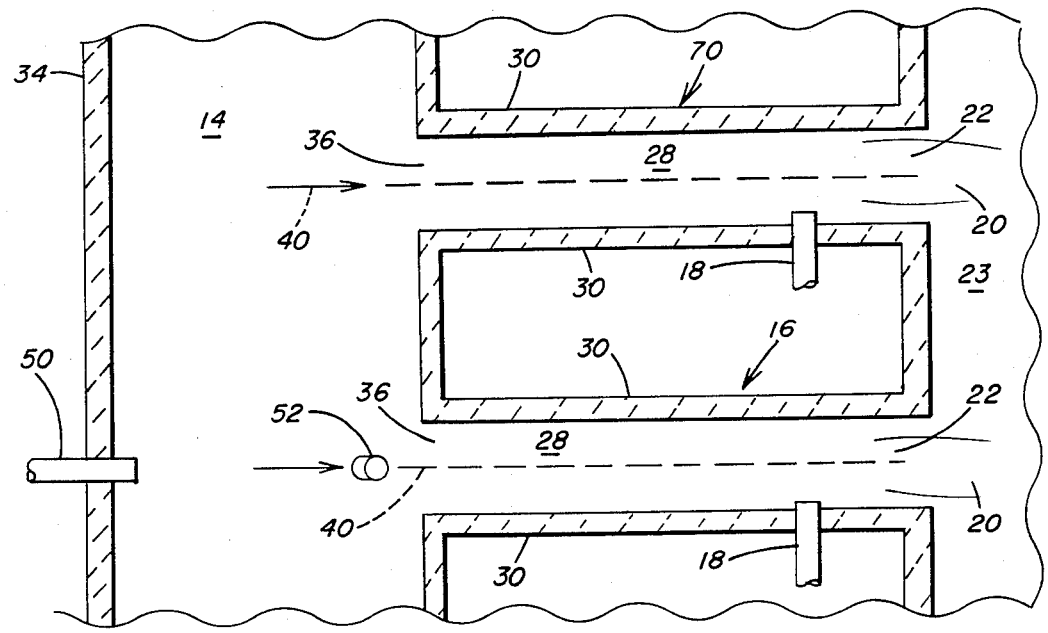
FIG. 3 is a horizontal cross-sectional view of a multiport furnace showing both a target wall and plenum topwall air jet for increasing and decreasing respectively combustion air flow into one of two ports in accordance with the teachings of the invention.

FIG. 3 is a plan view of a portion of the furnace showing the additional firing port 70 having no air jets and the port 16 with both the inducing target wall jet 50 and the impeding topwall jet 52 altering combustion air in any manner desired. As will be appreciated, in a multiport furnace, any number of or all ports may include air jets for apportioning combustion air from the plenum 14 among the plurality of ports. To protect the pipes from the hostile atmosphere within the chamber, the pipes may be made of a refractory material, e.g., a ceramic, or water cooled, for example, as taught in the above-referenced U.S. Pat. No. 4,375,236 at column 5, line 48, through column 6, line 15. Alternatively, the pipes may be purged, e.g., with relatively cool compressed air during the exhaust phase of the furnace firing cycle when used in a regenerative furnace of the reverse firing type. It may also be desirable to minimize the length of pipe extending into the chamber by appropriate location of the pipe.

In general, flow control pipes for increasing combustion air flow into the port 16 may be inserted into the plenum at any convenient location, e.g., an existing access hole in a plenum wall, as long as they direct the air jet toward the opening 36 in a direction generally cocurrent with the primary combustion air flow. Although not limiting to the invention, for decreasing the flow, it is preferred that the flow control pipe 52 be located closer to the opening 36 than to the target wall 34, and most preferably adjacent to the opening 36 to maximize the impeding effect of the air jet on combustion air flowing from the plenum 14 through the opening. In the interest of pipe durability, it may be desirable to chose a location which minimizes the length of pipe extending into the plenum.

Principle parameters to be considered in the practice of the invention include flow control, pipe opening or nozzle diameter and air jet pressure, volume flow rate, and velocity which parameters are interrelated.

In general, a nozzle diameter that is too small can render the air jet ineffective by unduly restricting the volume flow rate of air. On the other hand, if unduly large nozzles are employed, the volume flow rate is increased but the velocity is reduced, thereby reducing the effectiveness of the air jet. Velocity can be increased with a large diameter nozzle by employing greater air pressures, but the resultant increased volume flow rate may be greater than desired, as discussed below.

The amount of air injected by the air jets is not limiting to the invention. An upper limit on the practical volumetric flow rate for an air jet in a furnace using preheated combustion air, e.g. the regenerative furnace 10 shown in FIG. 1, is the cooling effect and consequent loss of thermal efficiency if excessive amounts of unheated air are injected into the preheated combustion air. In general, the volume flow rate of an air jet need be only a minor portion of the total flow through the respective port or other passageway to have a significant effect on the total flow rate, and therefore the overall temperature of the preheated combustion air stream is not substantially reduced. In most cases, the unheated air jet need not constitute more than 10% of the flow rate of preheated combustion air, and preferably no more than 4%. In specific examples set forth more fully below, involving a seven port, reverse fired, regenerative glass melting furnace, air jet flow volumes of about 1.0 to 1.3% of the combustion air passing through the port were found to provide adequate flow control. Even smaller air jet flow rates can yield significant results. The amount of air injected depends primarily upon the amount of flow control needed in the particular combustion chamber or firing port, the total combustion air through the port, and fuel input to the port, all depending on overall furnace design and conditions. Of course, preheating the injected air would avoid the problem of cooling the preheated combustion air permitting larger air jet flow rates, if desired.

In general, high velocity is more effective than large volume, and therefore, at a given pressure, smaller diameter nozzles are preferred. Nozzle diameter and air jet velocity are largely determined by the inducing or impeding effect needed for control in the particular furnace. In the case of the type of glass furnace described herein, with an air jet operating within the preferred volumes discussed above, air jet velocities on the order of about 300 ft/sec, (91.4 m/s) or greater may achieve a measurable increase or decrease of combustion air flow through a firing port having a volumetric flow rate through the port in the range of about 270,000 to 300,000 SCFH (standard cubic feet per hour) without the air jet. Higher velocities will normally produce greater control, e.g. larger increases or decreases, with about 1,000 ft/sec. (304.8 m/s) yielding suitable control for a range of firing rates typical for a multiport glass melting furnace. In addition to the velocity of air injected by the flow control pipe, the volume of air injected also affects the inducing or impeding effect of the air jet, with larger volumes having a greater effect than small volumes. However, unduly large volume flow rates are preferably avoided so as to minimize the cooling effect of the injected air on incoming heated combustion air. More particularly, the volume of air introduced by the air jet should be such that it does not significantly disturb the temperature of the combustion air flowing through the port. For example, if the air jet introduces unheated gas into the firing port, and the combustion air flowing through the port is preheated, e.g. as in the regenerative furnace 10, it is preferable to use a high velocity rather than a high volume air jet for minimizing the effect of the air jet on thermal efficiency of the firing port.

The following table represents results using an air jet inserted in the plenum target wall directed toward the third port (as numbered beginning with the port closest to the batch input end of the furnace) in a 7 port regenerative, reverse firing, glass melting furnace having the ports on about 10 feet center to center spacing. The pipe 50 was located below the line 40 for ease of construction and angled upward at about 5° from the horizontal so that the jet was directed generally toward the center of the opening 36. As practiced, the pipe 50 was purged to cool it using a small amount of compressed air during the reverse firing phase.

The total volume of combustion air flowing through the port 16 was calculated using the following empirically derived equation:

$$A = 10G(1+E)$$

wherein
- A = the total volume of air flow through the port (SCFH);
- G = volume of fuel input to the port (SCFH); and
- E = excess air, determined from the measured oxygen content in flue gases as follows:

$$E = 9X/(10(0.21-X))$$

where
- x = oxygen content of flue gases as measured in the port opposite the firing port, measured as % of $O_2$ in the flue gases and converted to a decimal fraction.

(SCFH = standard cubic feet per hour)

As practiced for increasing combustion air flow through the port, i.e. total volume "A" above, using pressurized air supplied by the pipe 50, the air jet flow rate was selected to reduce the amount of combustibles in exhaust gases, as determined by flue gas analysis, to zero.

TABLE I

| | Trial 1 | Trial 2 | Trial 3 |
|---|---|---|---|
| Air Jet Nozzle Diameter (In.) | 0.27 | 0.27 | 0.20 |
| Air Jet Flow Rate (SCFH) | 3492 | 3843 | 3065 |
| Combustion Air Volume In Port Without Air Jet (SCFH) (calculated) | 270,600 | 295,750 | 287,180 |
| Flue Gas Analysis Without Air Jet-$O_2$% | 0.3 | 0.3 | 0.3–0.4 |
| Flue Gas Analysis Without Air Jet-Combustibles % | 0.4 | 0.6–0.7 | 0.5 |
| Flue Gas Analysis With Air Jet-$O_2$ % | 1.4–1.6 | 1.2 | 0.9 |
| Flue Gas Analysis With Air Jet-Combustibles % | 0.0 | 0.0 | 0.0 |
| Increase In Combustion Air Flow Rate to Port (SCFH) (calculated) | 29,770 | 35,790 | 24,490 |

As can be seen from the Table, injecting air through the flow control pipe 50 at about 1.0 to 1.3% of total combustion air input to the port leads to an increase in total combustion air flow of from about 8 to 12% with a reduction in excess combustibles (unburned fuel) from about 0.4% to near zero. Of this increase, an average of only about one percentage point is attributable to the air jet itself, the remainder is attributable to inducement of additional combustion air from the plenum 14 into the port 16. In general, the increase in combustion air flow will be considerably greater than the volume input of the air jet. In a furnace of the type described, it is estimated that for most operating modes, the air jet stream will contribute less than 20% of the increase in total air flow through the port.

The above example was presented for illustration purposes and is not limiting to the invention. The amount of air injected by the air jets is not limiting to the invention. In the above example, the air jet was used at about 1.0 to 1.3% of total combustion air flowing through the port, as most practical for the particular environment of its use. As noted above, an upper limit on the practical volumetric flow rate for an air jet in a furnace using preheated combustion air, e.g. a regenerative furnace, is the cooling effect and consequent loss of thermal efficiency if the injected air is unheated.

For a discussion of air jets within a firing port, reference is made to copending, commonly assigned U.S. patent application Ser. No. 510,807, filed even date, entitled "Port Wall Air Jet For Controlling Air" of E. Savolskis, the teachings of which are hereby incorporated by reference.

Although the above description used air as the injected gas, the invention may be advantageously practiced using any gas. For example, under some circumstances, it may be desirable, e.g. for increasing flame temperature, to add controlled amounts of oxygen to the combustion air. The flow control pipes may conveniently be utilized to simultaneously increase oxygen input and alter combustion air input to the port.

Other variations such as position of flow control air jet pipes as well as dimensions and flow rates can be made without departing from the scope of the invention as defined by the claims which follow.

I claim:

1. A method of operating a regenerative furnace wherein combustion gas is preheated in a regenerator bed and then is passed to a plenum communicating along its length with a plurality of ports through which the combustion gas passes into the furnace, and fuel is combined with the combustion gas at the ports; the improvement comprising apportioning the flow of combustion gas among the plurality of ports by injecting a stream of gas in the plenum at the entrance to at least one of the ports so as to affect the portion of the combustion gas entering that port.

2. The method of claim 1 wherein the stream of gas is injected cocurrent with the flow of combustion gas into the port so as to increase the portion of combustion gas flowing through that port.

3. The method of claim 1 wherein the stream of gas is injected countercurrent to the flow of combustion gas into the port so as to decrease the portion of combustion gas flowing through that port.

4. The method of claim 1 wherein the stream of gas is a jet of compressed air.

5. The method of claim 1 wherein the stream of gas is injected into the plenum at high velocity relative the velocity of combustion gas flowing through the port.

6. The method of claim 1 wherein the stream of gas injected into the plenum is no greater than 10% by volume of the combustion gas flowing through the port with which it is associated.

7. The method of claim 1 wherein the stream of gas injected into the plenum is no greater than 4% by volume of the combustion gas flowing through the port with which it is associated.

8. The method of claim 1 wherein a stream of gas is injected at the entrances to a plurality of the ports so as to control the flow of combustion gas into each respective port.

9. The method of claim 1 wherein the stream of gas is directed into the plenum through a wall opposite the entrance to the port.

10. The method of claim 1 wherein the stream of gas is directed into the plenum through a roof portion of the plenum.

11. The method of claim 1 wherein combustion takes place within the furnace above a pool of at least partially melted glass.

12. The method of claim 1 wherein gas flow through the furnace periodically reverses so that said ports receive exhaust gas from the furnace.

* * * * *